(12) United States Patent  
Johnson (10) Patent No.: US 6,955,187 B1  
(45) Date of Patent: Oct. 18, 2005

(54) ZINC-AIR BATTERY CONTROL VALVE

(75) Inventor: A. David Johnson, San Leandro, CA (US)

(73) Assignee: TiNi Alloy Company, San Leandro, CA (US)

( * ) Notice: Subject to any disclaimer, the term of this patent is extended or adjusted under 35 U.S.C. 154(b) by 135 days.

(21) Appl. No.: 10/623,139

(22) Filed: Jul. 16, 2003

(51) Int. Cl.[7] .............................................. E03B 1/00
(52) U.S. Cl. ..................... 137/625.33; 251/11; 429/27; 429/34
(58) Field of Search ..................... 137/625.33; 251/11; 428/27, 34

(56) References Cited

U.S. PATENT DOCUMENTS

| | | | | |
|---|---|---|---|---|
| 4,177,327 A | * | 12/1979 | Mathews et al. | 429/27 |
| 4,893,655 A | * | 1/1990 | Anderson | 137/625.33 |
| 5,116,252 A | * | 5/1992 | Hartman | 137/625.3 |
| 5,218,998 A | * | 6/1993 | Bakken et al. | 137/625.28 |
| 5,837,394 A | * | 11/1998 | Schumm, Jr. | 429/27 |
| 6,386,507 B2 | * | 5/2002 | Dhuler et al. | 251/11 |
| 6,811,910 B2 | * | 11/2004 | Tsai et al. | 429/27 |

* cited by examiner

Primary Examiner—John Fox  
(74) Attorney, Agent, or Firm—Richard E. Backus (57) ABSTRACT

A zinc-air battery and control valve for controlling air flow to energize the battery. Telescoping inner and outer valve sleeves each have a plurality of openings that when aligned communicate air from the exterior to the interior of the valve. Two actuators are provided, one to open the valve and the other to close it. All of the openings are opened or closed simultaneously by sliding motion of the valve sleeves that fit concentrically together. A bistable latching mechanism is provided to keep the valve in either of its two positions. A pair of switches operate in coordination with the latching mechanism so that a closed circuit is established for changing the state from that which was last established.

5 Claims, 8 Drawing Sheets

ZINC-AIR BATTERY CONTROL VALVE

BACKGROUND OF THE INVENTION

1. Field of the Invention

The invention relates in general to valves for the control of fluid flow. More particularly, the invention relates to fluid control valves for use in zinc-air batteries.

2. Description of the Related Art

Electrochemical cells are used for electrically powering portable and mobile devices. Typically these are ganged together to form batteries that provide from 3 to 15 volts. Examples are lead-acid batteries in automotive applications, nickel-cadmium batteries used to power hand-held devices such as electric flashlights, and lithium batteries used in lap-top computers, cameras and cell phones.

Another type of electrochemical cell is that of a zinc-air battery which is activated when air as the fluid enters the cell. A typical zinc-air battery cell is comprised of an electrolyte, such as an alkali hydroxide in a 20–40% weight solution with water. The battery acts as a partial fuel cell because it uses oxygen from air as the cathode. Oxygen is let into the battery and is reduced on a carbon surface. The cathode undergoes the electrochemical reaction ½ $O_2 + H_2O + 2e = 2\ OH^-$. The anode is zinc which undergoes the reaction $Zn^{2+} + 2\ OH^- = Zn(OH)_2$. The overall reaction is $2\ Zn + O_2 + 2\ H_2O = 2\ Zn(OH)_2$ which produces an electrical potential or voltage.

The electrical potential produced by the cell can drive a current to a load in an electrical circuit. The cell reactions, and therefore the current, terminate when the cell is isolated from the oxygen source.

Each battery technology has advantages and disadvantages. One method of comparing batteries is to rank them by cost versus weight per watt-hour of energy storage. By these criteria, zinc-air batteries can out-perform existing technologies as well as the majority of other technologies that are planned for development.

One feature of zinc-air batteries has inhibited their development. Existing electrochemical cells become saturated under conditions of no load so that during periods of non-use the energy content is preserved or lost only gradually. Thus the shelf life of such a cell is reasonably long. The oxidation process in zinc-air cells however continues as long as the electrode is exposed to oxygen, so the shelf life of the battery is severely reduced. It would be desirable to provide a fluid flow control valve in electrochemical cell of a size which is sufficiently small for use in electrically powering portable and mobile devices with long shelf life.

The need has therefore been recognized for a fluid control valve for electrochemical cells which obviates the foregoing and other limitations and disadvantages of prior art fluid control valves. Despite the various fluid control valve in the prior art, there has heretofore not been provided a suitable and attractive solution to these problems.

OBJECTS

It is a general object of the invention to provide a new and improved fluid control valve for electrochemical cells.

Another object is to provide a fluid control valve of the type described in which the valve actuation is powered from the cell itself.

Another object is to provide a fluid control valve of the type described which enables an electrochemical cell to have longer shelf life.

Another object is to provide a fluid control valve of the type described which enables an electrochemical cell to be manufactured in a size which is sufficiently small for use in powering portable and mobile devices.

Another object is to provide a fluid control valve of the type described which prevents an oxidizer from reacting with an electrode except when an electrical load is attached and useful electrical current is being drawn from the cell.

DESCRIPTION OF THE PREFERRED EMBODIMENTS

Figure 1:
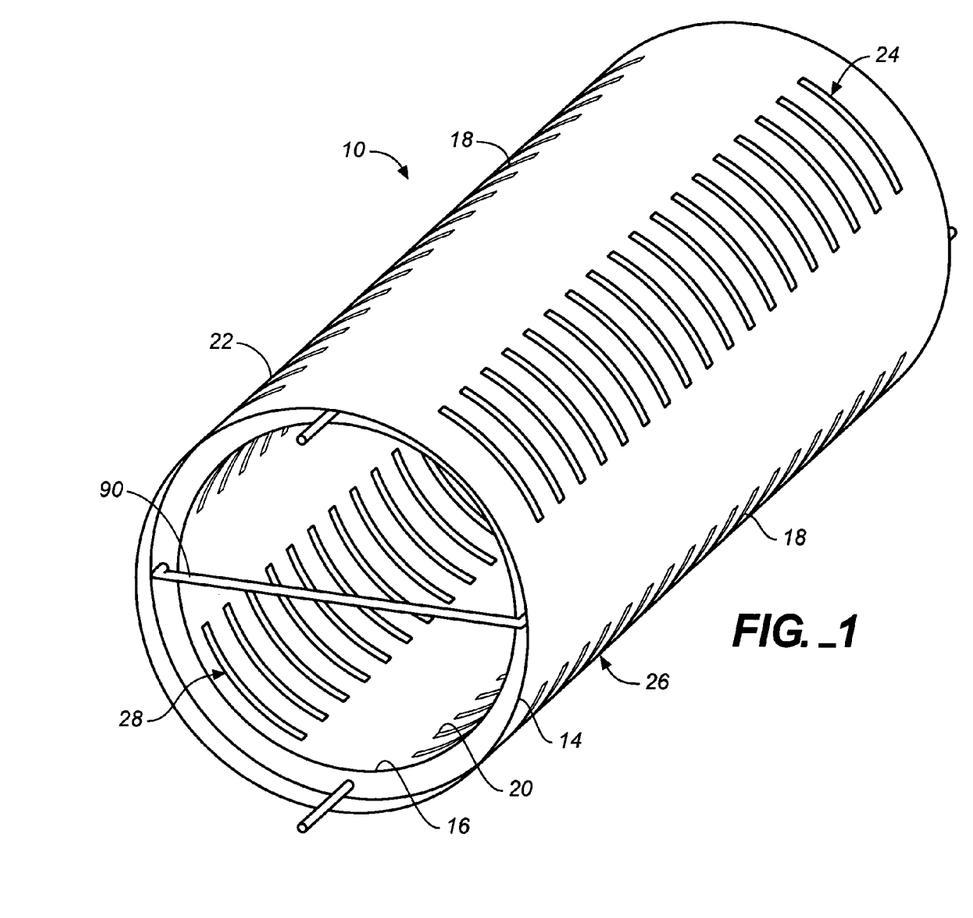
FIG. 1 is an isometric view of a pair of valve sleeves concentrically mounted in a subassembly which is a component of the fluid control valve assembly of FIGS. 5 and 6 in accordance with one preferred embodiment of the invention.
Figure 2:
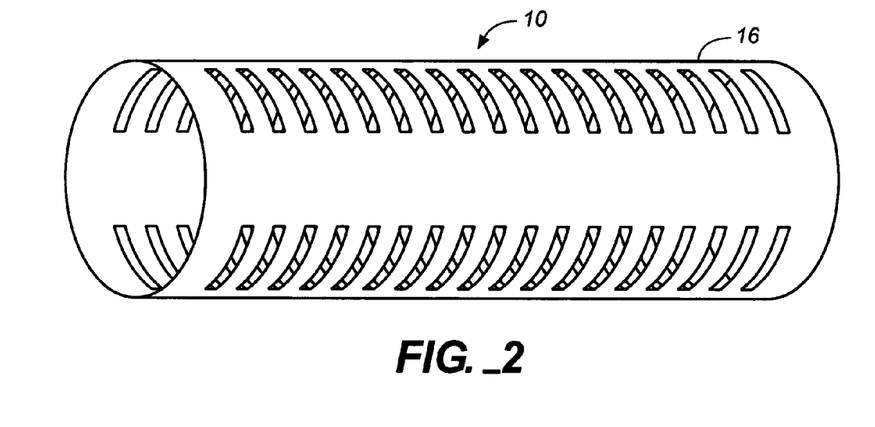
FIG. 2 is an isometric view of one of the pair of valve sleeves in the subassembly in FIG. 1.
Figure 3:
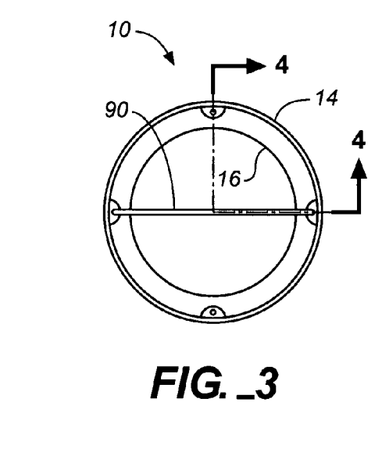
FIG. 3 is a cross sectional view of the subassembly in FIG. 1.
Figure 4:
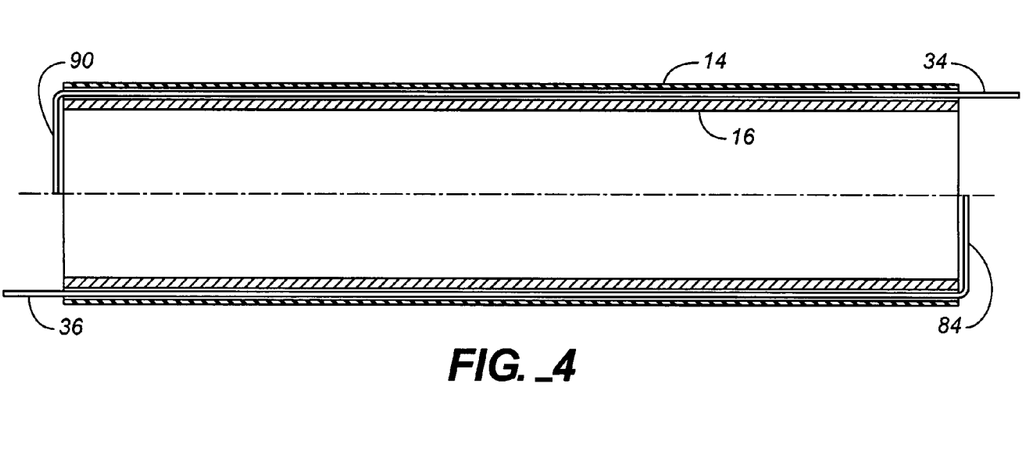
FIG. 4 is a longitudinal section view taken along the line 4—4 of FIG. 3.
Figure 5:
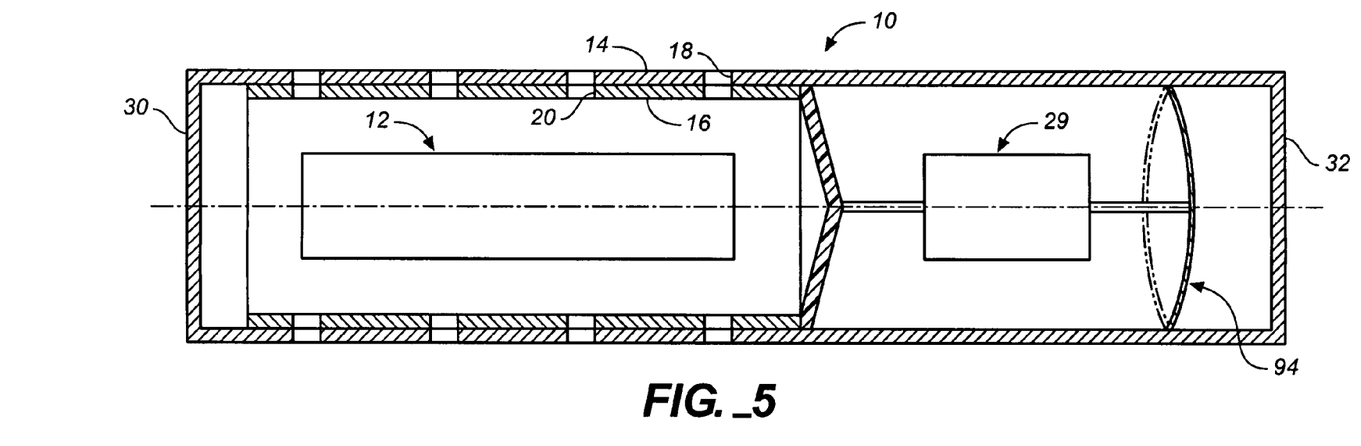
FIG. 5 is a longitudinal section, partially schematic view of a valve assembly incorporating the valve sleeve subassembly and electrochemical cell of FIG. 1 with the valve shown in its fully on state.
Figure 6:
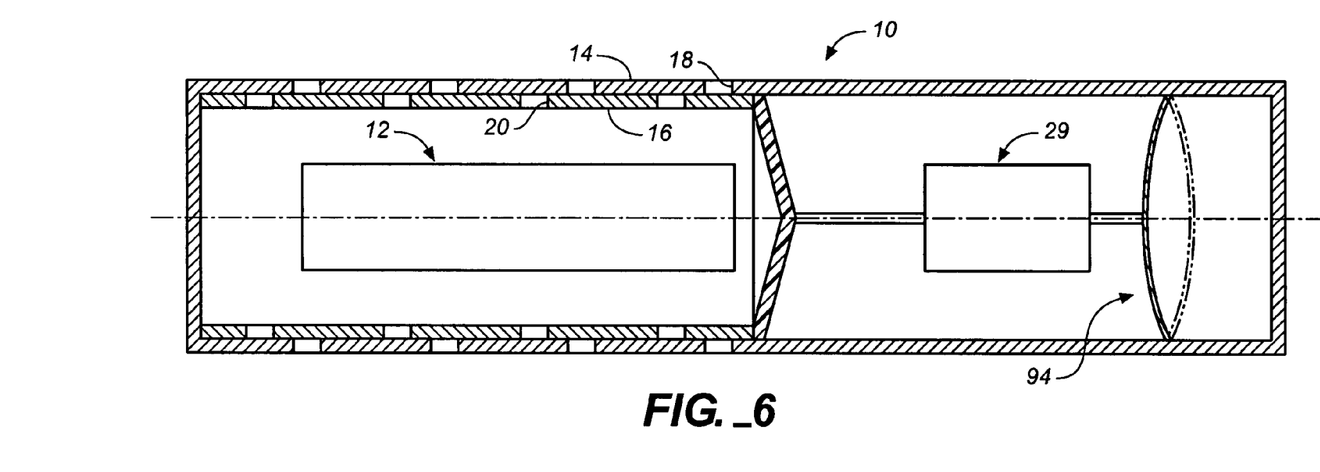
FIG. 6 is a longitudinal section, partially schematic view similar to FIG. 5 with the valve shown in its fully off state.

In the drawings, FIGS. 1–4 illustrate generally at 10 a valve sleeve subassembly which is a component of the control valve and electrochemical cell assembly 12 of FIGS. 5 and 6. The valve sleeve subassembly is comprised of a tubular outer valve sleeve 14 and a tubular inner valve sleeve 16. The pair of sleeves are concentrically mounted together in axially sliding relationship in the manner of telescoping tubes. The inner sleeve's outside surface and the outer sleeve's inside surface fit in sufficiently close contact for creating an air seal at their interface. FIG. 2 shows details of inner sleeve 16.

A plurality, shown as seventy-two, of openings 18 are formed in outer valve sleeve 14. A corresponding number of openings 20 are formed in inner valve sleeve 16. Preferably the openings comprise circumferentially extending elongate slots. In each sleeve a number of the slots, shown as eighteen, are spaced apart longitudinally of the sleeve in a plurality, shown as four, of rows 22, 24, 26 and 28. The slot rows are arranged in circumferentially spaced relationship around each sleeve.

The total number, size, spacing and orientation of the slots are the same for each sleeve. When fitted together, the slot rows of both sleeves are arranged in circumferential alignment. By this arrangement when one sleeve is moved through an axial stroke relative to the other the slots are either brought into register (in a valve open mode as shown in FIG. 5) to open fluid flow therethrough, or they are brought out of register (in a valve closed mode as in FIG. 6) to fully block the flow. The sleeves are moved through their axial strokes between the open and closed modes by actuator mechanism 29 as described in connection with FIGS. 5–10.

The identical spacing and orientation of the slots in the two sleeves enables the flow paths through all slots to open simultaneously as the sleeves are brought into the valve open mode. Axially spacing between adjacent slots in the rows is made sufficiently small so that a relatively large area, provided by the combined slots, is almost immediately opened to fluid flow responsive to the short valve sleeve stroke that is required for switching from the closed to the open mode. This enables a fast response time for the electrochemical cell to be brought into operation following actuation.

Referring to FIG. 5, electrochemical cell 12 is fitted within the valve sleeve subassembly so that the cell is exposed for chemical reactions of the type described above in Description of Related Art section of this disclosure. An external fluid, such as air (comprising oxygen) where the cell is of the zinc-air type, flows inwardly to begin the reactions when the slots are in register during the valve open mode. A circular end cap 30 is fitted on one end of outer sleeve 14, and another circular end cap 32 is fitted on that sleeve's opposite. These two end caps complete the sealing of the inner volume when the sleeves are in the valve closed position to prevent unintended ingress of the fluid, which would otherwise deactivate the cell over time.

Valve 10 further comprises an actuator mechanism, represented schematically by the box 29 in FIGS. 5–6, for causing valve sleeves 14 and 16 to undergo relative axial movements or strokes between the fully closed or off valve state shown in FIG. 5 and the fully open or on valve state of FIG. 6.

Figure 7:
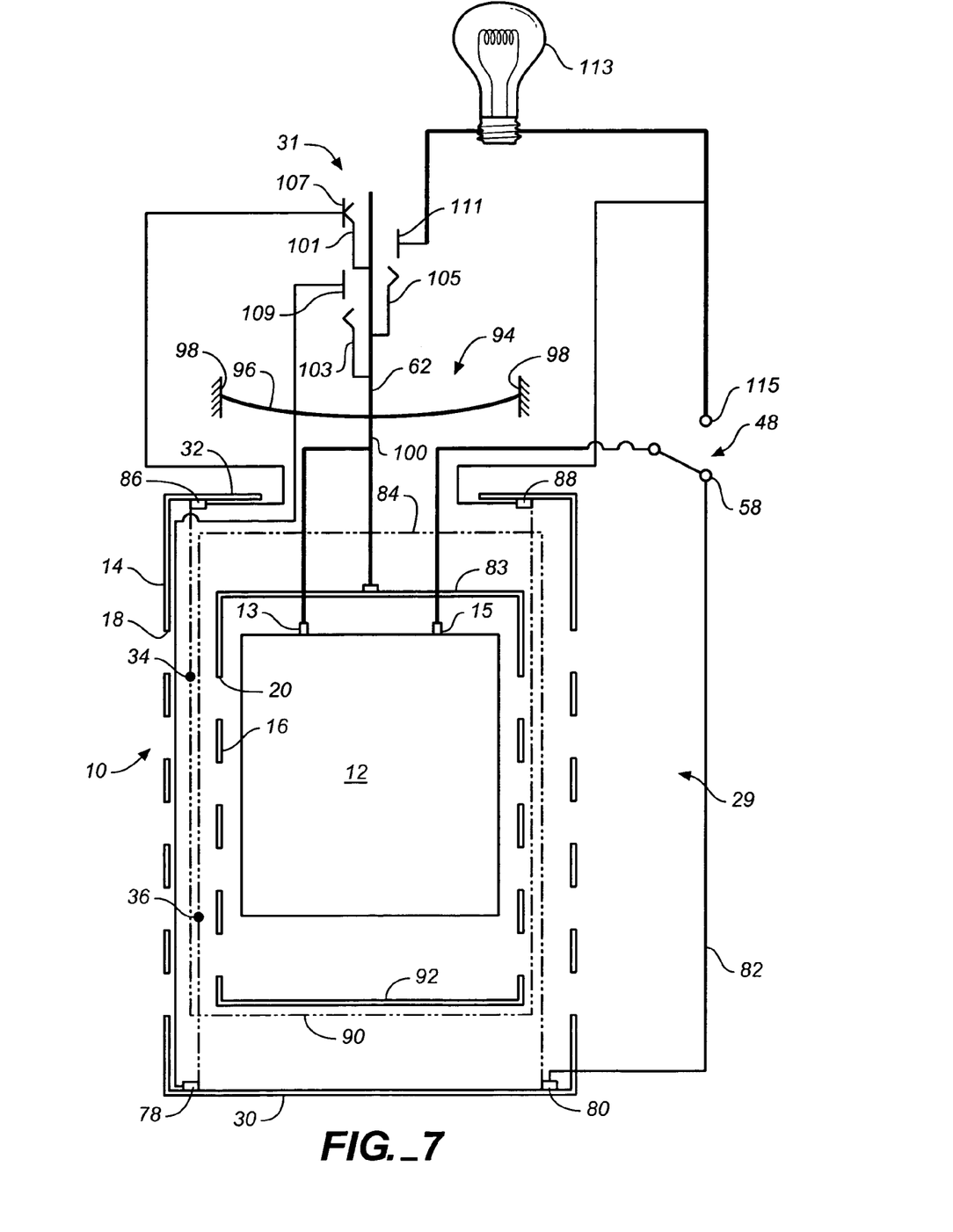
FIG. 7 is a schematic diagram of a control circuit for the valve assembly of FIG. 5 showing the circuit configuration in the fully off state.
Figure 8:
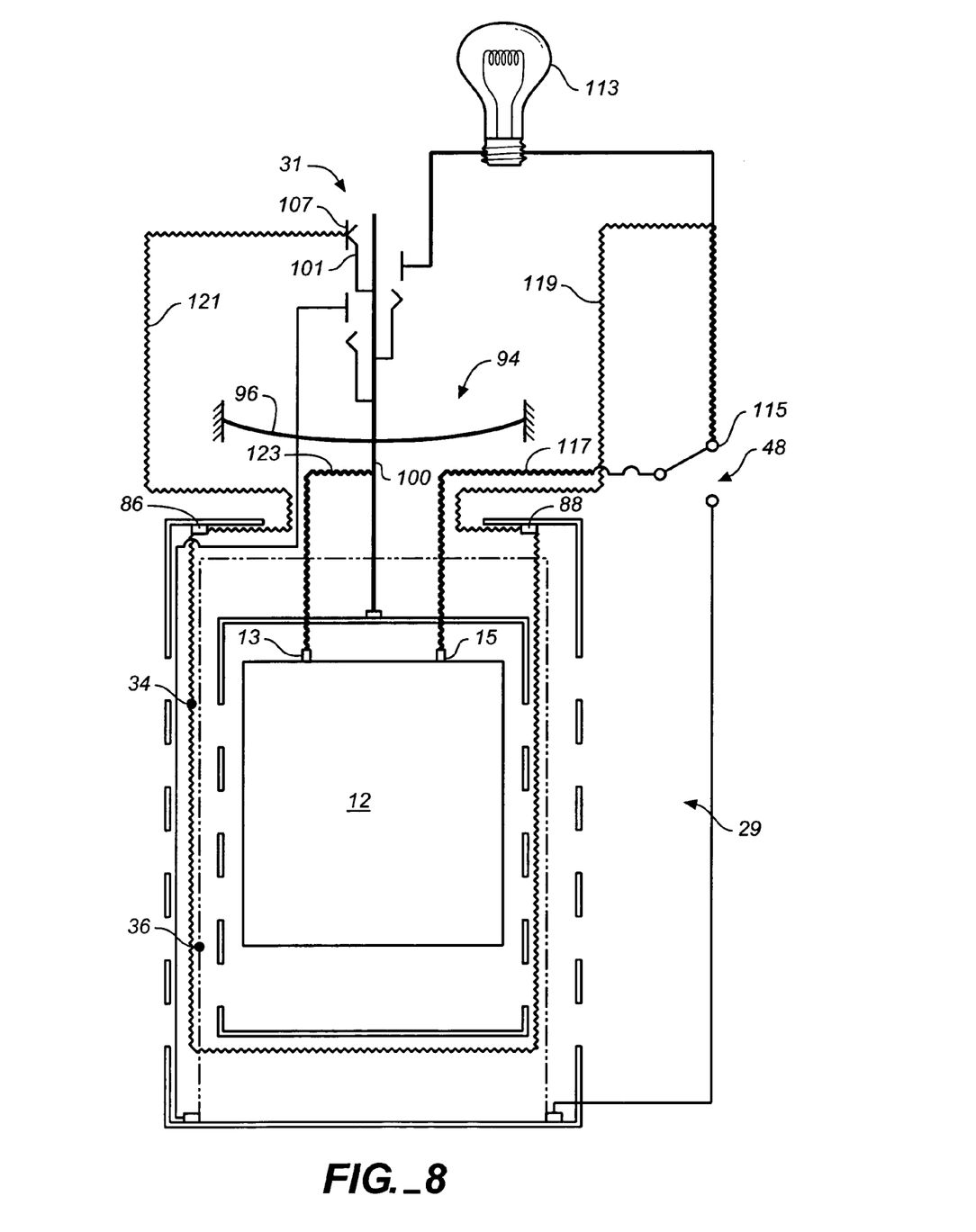
FIG. 8 is a schematic diagram of a control circuit for the valve assembly of FIG. 5 showing the circuit configuration in the transition from off to on states.
Figure 9:
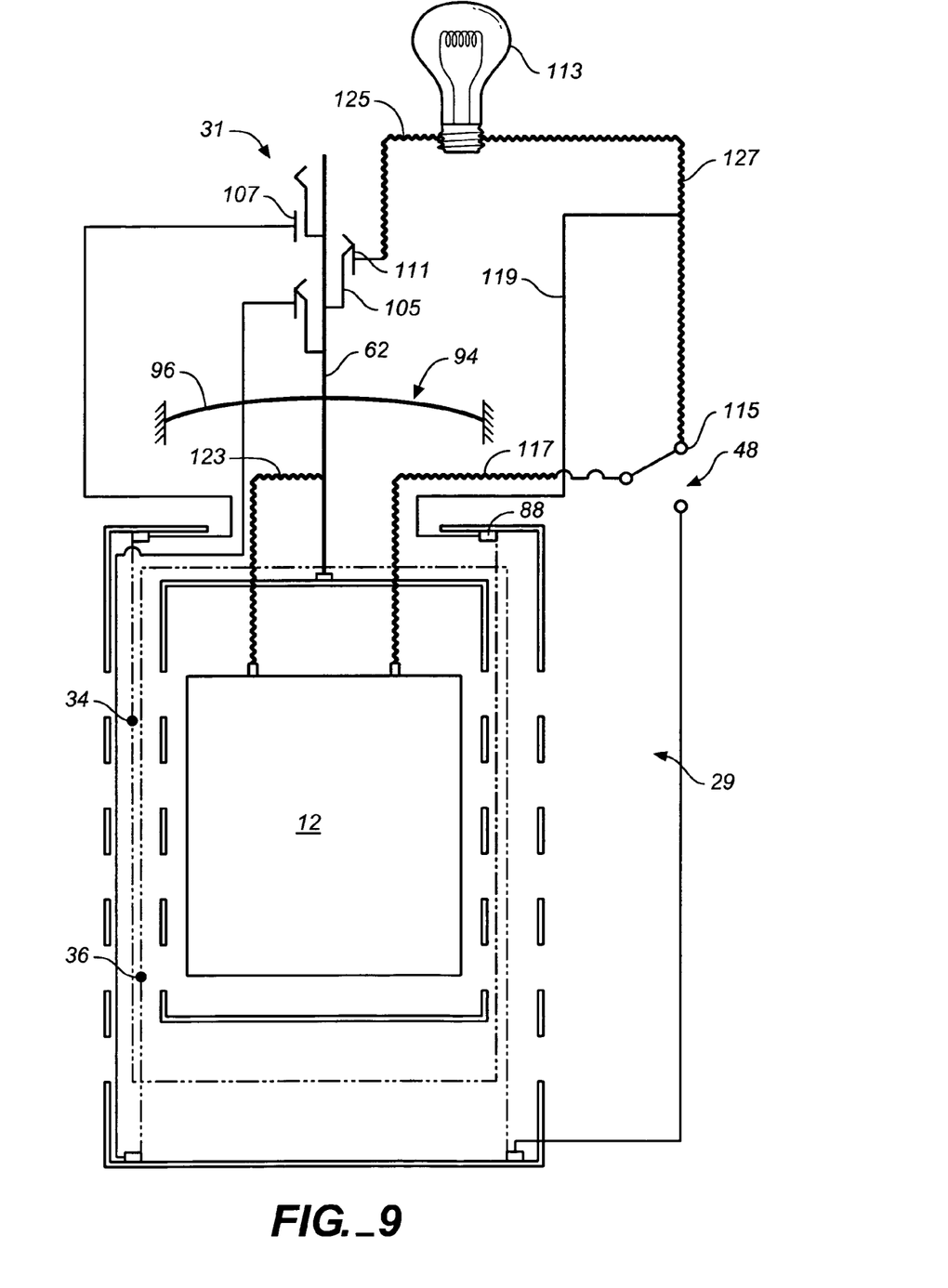
FIG. 9 is a schematic diagram of a control circuit for the valve assembly of FIG. 5 showing the circuit configuration in the fully on state.
Figure 10:
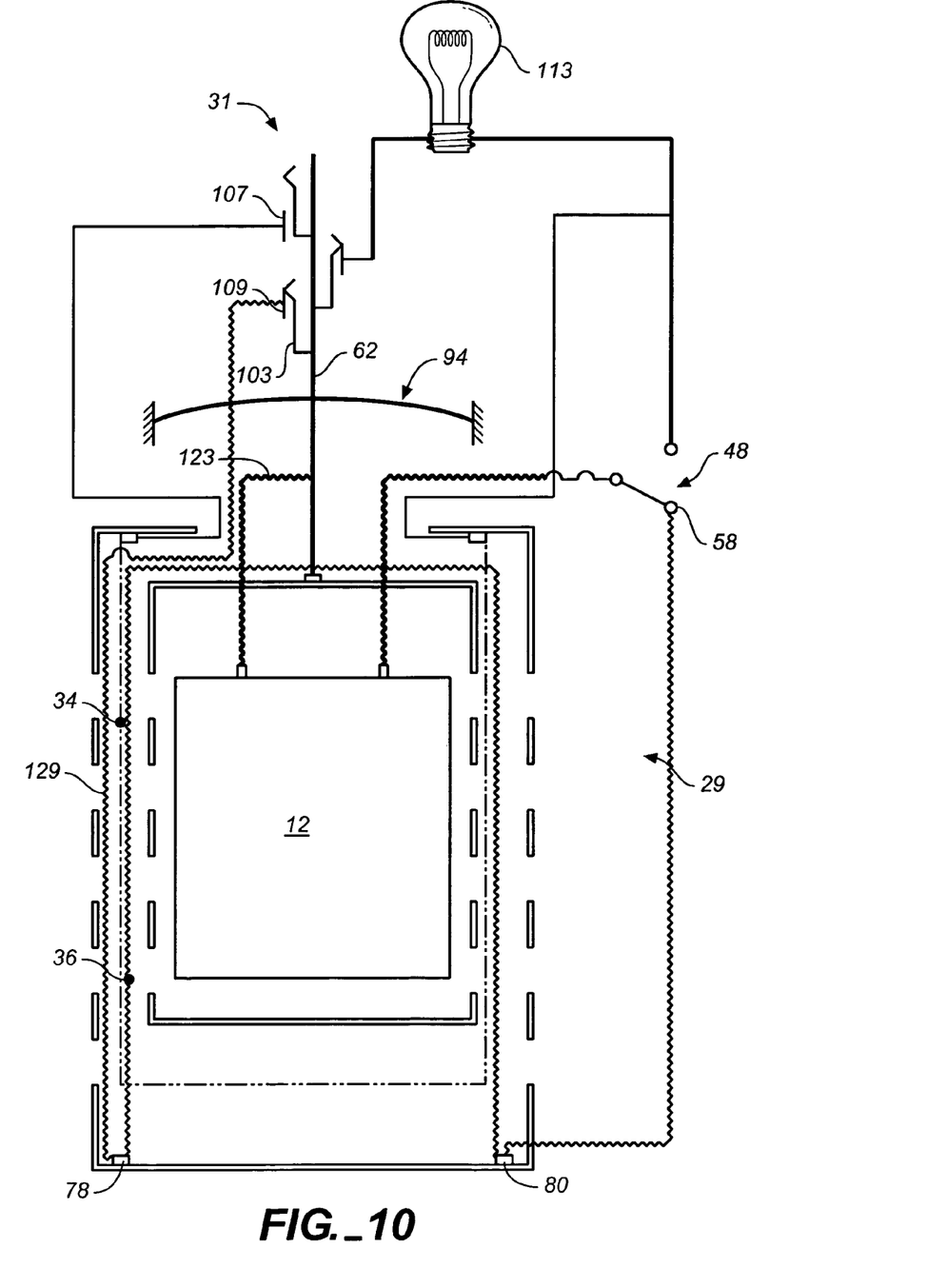
FIG. 10 is a schematic diagram of a control circuit for the valve assembly of FIG. 5 showing the circuit configuration in the transition from on to off states.
Figure 11:
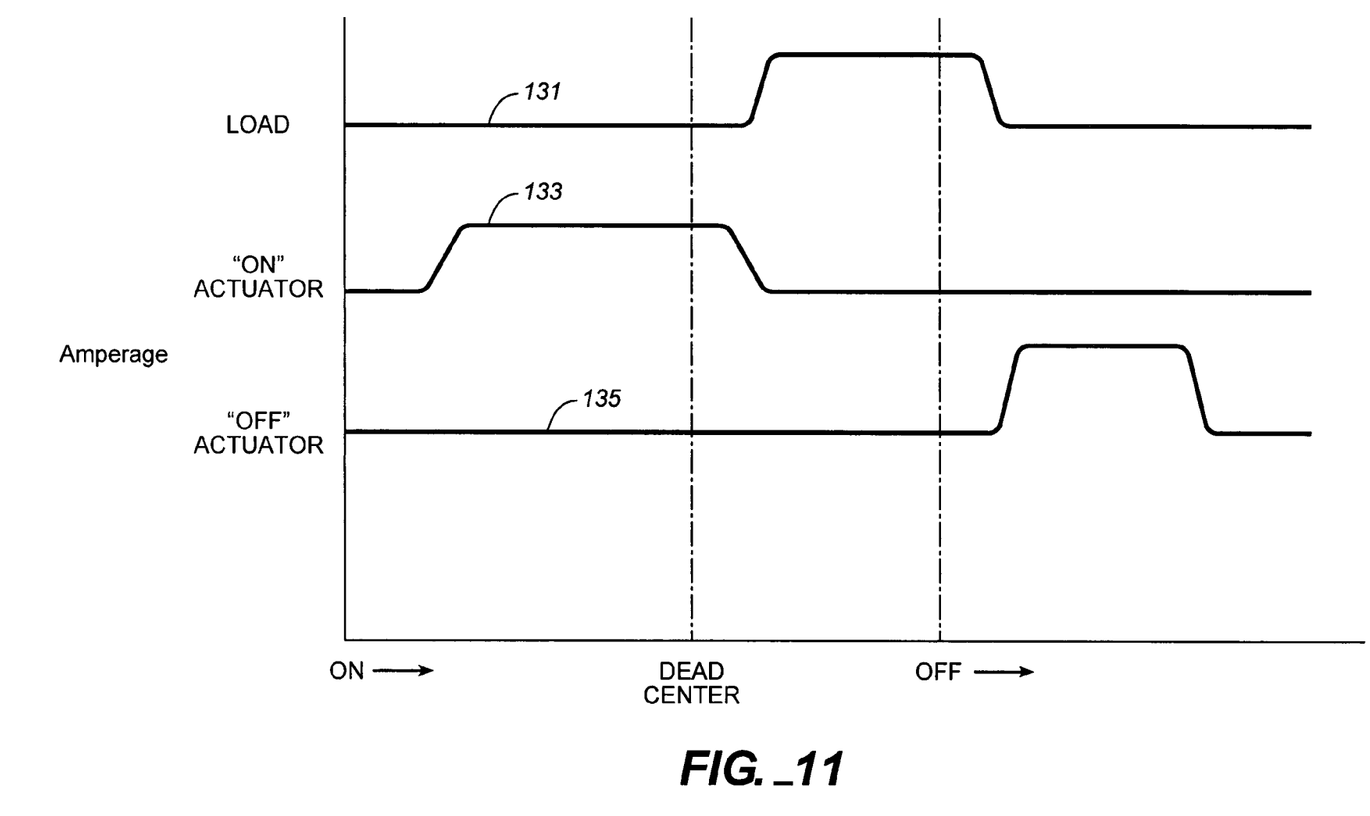
FIG. 11 is a chart showing current amperage in the load and valve actuators as a function of valve state for the circuit of FIGS. 7–10.

The actuator mechanism comprises a circuit having a control switch 31, shown in the schematic diagrams of FIGS. 7–10, which operates the actuator in transition between the fully off and fully on states. FIG. 7 shows the circuit configuration in the fully off state. FIG. 8 shows the circuit configuration in transition from the off to the on states. FIG. 9 shows the circuit configuration in the fully on state. FIG. 10 shows the circuit configuration in transition from the on to the off states. In FIGS. 7 to 10 the schematic representations show an exaggerated radial spacing between the two sleeves for purposes of clarity of this explanation; in practice the sleeves closely fit together in fluid sealing relationship, as shown in FIGS. 5 and 6.

Actuator mechanism 29 comprises a pair of an "on" actuator element 34 and an "off" actuator element 36 (FIGS. 7–10). Both actuator elements are comprised of a wire, or pair of wires, formed of a shape memory alloy (also called SMA) material. Preferably the SMA is TiNi, also called Nitinol. TiNi is an alloy of nearly equal atomic fractions of Titanium and Nickel. Other suitable SMA materials include CuAlNi and TiNiPd alloys. The SMA material is characterized in being ductile and easily deformed when in its cold state, i.e. below the material's crystalline phase change transformation temperature, and which produces large stresses, with shape recovery of about 3% to the material's memory shape, when heated through the transition temperature. The transition temperature can be varied as required for a particular application by selectively changing the percentage compositions of the metals of which the alloy is formed. For example, increasing the content of nickel lowers the transition temperature. As used herein, "heated through the transition temperature." means the case of heating above the transition temperature range as well as within that range when phase change begins.

The SMA of both actuator wires 34 and 36 when formed are annealed in accordance with known techniques so that when later heated through the transition temperature they contract in length toward their memory shapes.

A preferred method for heating the actuator wires is by electrical resistance heating through the control circuit of FIGS. 7–10. In this circuit the power source for heating the wires is derived from electrochemical cell 12, which has two output terminals 13 and 15.

Referring to FIG. 7, one end of the "off" actuator wire 36 is electrically connected with terminal 78 and the wire's opposite end is connected with a terminal 80 that in turn is connected through line 82 to contact 58 of load switch 48. The two terminals 78 and 80 are both attached to end 30 of the outer sleeve. Wire 36 is U-shaped with one longitudinal segment extending from terminal 78 along the sleeves to one end of a transverse segment 84 that extends radially across an upper end 83 (as viewed in FIG. 7) of the inner sleeve. FIG. 4 shows segment 84 of the "off" actuator wire extending across the end of the inner sleeve. Another longitudinal segment of this wire extends from the other end of the transverse section back along the sleeves to terminal 80. By this configuration when "off" actuator wire 36 is activated it contracts in tension and produces a pulling force between the outer sleeve and inner sleeve ends. This pulling force causes the inner sleeve to move down relative to the outer sleeve as viewed in FIG. 7, which in turn moves the slots out of register to close the flow path.

One end of the "on" actuator wire 34 is electrically connected with a terminal 86 attached to end cap 32 of the outer sleeve. The wire's opposite end is connected with a terminal 88 that is also attached to that end cap. Wire 36 is U-shaped with one longitudinal segment extending from terminal 86 along the sleeves to one end of a transverse segment 90 that extends radially across a lower end 92 (as viewed in FIG. 7) of the inner sleeve. As shown in FIGS. 1, 3 and 4, "on" segment 90 of actuator wire 34 extends diametrically across the end of inner sleeve 16. Another longitudinal segment of this wire extends from the other end of the transverse section back along the sleeves to terminal 88. By this configuration when "on" actuator wire 34 is activated and contracts it produces a pulling force between inner sleeve end 92 and outer sleeve end cap 32. This force causes the inner sleeve to move up relative to the outer sleeve as viewed in FIG. 7, which in turn moves the slots into register to open the flow path into cell 12.

Actuator mechanism 29 further comprises a bistable latch mechanism 94 which has a function of keeping the sleeves in either of their fully open or fully closed positions. The latch mechanism comprises a bistable element or beam 96 which operates in the manner of a buckling beam. The beam can be formed by an elastic material foil such as beryllium copper or steel. This beam is confined at its ends between two spaced supports 98. The beam length is greater than the spacing between the supports so that it is bent away either up or down from its central neutral position. Moving the beam from one side to the other from neutral changes it from one stable state to another stable state. The beam is attached to a rod 62 so that up and down movement of the beam operates control switch 31. Another rod 100 connects the beam with upper end 83 of the inner sleeve for coordinating switch operation with sleeve valve positioning, as explained more fully below.

It is advantageous to operate beam 96 by applying force at a point other than the center of the beam. The beam can be caused to buckle from one state to the other with smaller force and shorter displacement if a point about ⅓ of the distance from either end is used as the fulcrum rather than the center point.

Control switch 31 is comprised of three flexible blade contacts 101, 103 and 105 which are formed of an electrically conductive material. These contacts are mounted in cantilever relationship on rod 62 so as to slide into and out of contact with respective terminals terminals 107, 109 and 111 as the rod is axially displaced by movement of rod 100 by the axial movement of inner shell 16.

In FIG. 7 for the fully off valve state with rod 62 moved down, beam 96 of the latch mechanism is in its bistable down position (as viewed in the figure) such that the rod has operated control switch 31 so that the circuit through contact 111 is open and no current flows to a load 113. At the same time, the control switch closes blade 101 with contact 107 to enable a subsequent circuit path that will supply current into actuator wire 34 when the position of load switch 48 is changed. Also in this fully off state, the load switch opens the circuit from contact 115 so that no current flows into wire 36.

Transition from the off to the on state is initiated by changing load switch 48 to the position shown in FIG. 8. Current flow is via the lines that are shown in wave form. Thus it flows from cell terminal 15 through line 117 into load switch contact 115, then through branch line 119, then into terminal 88, "on" actuator wire 34 and terminal 86, then through line 121 into switch terminal 107, then across to contact 101 and rod 62, and then through line 123 into the other terminal 13 of the cell. Wire 34 then begins to heat up.

After wire 34 is heated through the transition temperature sufficient to induce contraction to its memory shape, inner sleeve 16 begins to move up relative to the outer sleeve. This brings the inner and outer slots into register to enable ingress of air into cell 12 and simultaneously moves rod 100 up. This upward movement of the rod causes bistable beam 96 to buckle up past its neutral or "dead center" position to the position shown in FIG. 9. This action also operates control switch 31 so that blade blade 105 closes with contact 111. This closes the circuit path for current flow via the lines shown in wave form. The path is from the cell through line 123 and rod 62, across control switch contact 111 into line 125 and the load, then through line 127 and closed terminal 115 of the load switch into line 117 and back to the cell. In this path current flows from the cell only into the load as the operation of the control switch also opens the current path through control switch contact 107 and the "on" actuator 34. Actuator 34 then begins to cool, such as by conduction and convection to ambient air. When cooled below its transition temperature, the actuator becomes ductile and is stretched back to its cold shape when the "off" actuator 36 is activated and moves the valve sleeves in the next phase, as explained in connection with FIG. 10.

Transition from the on to the off states is initiated by changing load switch 48 to the position shown in FIG. 9. Current flow is via the lines that are shown in wave form, that is from cell 12 through the load switch contact 58, then through contact 80 of "off" actuator wire 36 which begins to heat, then out through terminal 88 of wire 36, then through line 129 and control switch contact 109 across to blade contact 103, and then through the rod and line 123 back to the cell. When wire 36 is heated through its transition temperature it contracts and moves the inner sleeve down relative to the outer sleeve. Simultaneously, bistable beam 96 is buckled down past its neutral position to the stable down position shown in FIG. 7, bringing the slots out of register and occluding fluid flow into the cell. As the beam completes its downward movement the control switch is operated by rod 62 back to the position shown in FIG. 7 where the circuits to both actuator wires are opened.

The chart of FIG. 10 plots current amperage in the load and valve actuators as the valve is switched between on and off states. Curve 131 shows amperage values through load 44, curve 133 the values through "on" actuator 34, and curve 135 the values through "off" actuator 36 as functions of the "on," dead center and "off" states.

The use of bistable latch mechanism 94 is an important aspect of this invention in that it guarantees that valve sleeve stroke movements are completed to ensure that one actuator is turned fully 'off' while the other is fully 'on'. It is essential to the function of the invention that one and only one actuator is connected to the load switch at any given time, and is further essential that an actuator connected to the load switch must be connected to the terminal of the load switch that does not have voltage on it. Further, whichever actuator is energized, the operation of that actuator turns that actuator 'off' and the other 'on'.

Control switch 31 is the switch that connects external load 113 to the battery or cell 12. In the resting state, whichever contact of the control switch that is "active" is connected to a contact leading to the battery that is open, so that no current is flowing to either actuator wire. When the state of the load switch is changed, it is connected to the active contact on the battery, so that current flows to an actuator. This actuator moves the valve and, under control of the bistable device, continues to move until the active actuator is disconnected and the alternate actuator is enabled.

FIGS. 7–10 illustrate how load management can be done with the control valve of the invention. The external battery load is equipped with a control switch by which when the load is turned 'on' or 'off', energy is directed to operate one of a pair of actuators that determine the position of a bistable beam, either "down" (valve closed) or "up" (valve open). Power to the actuator is momentary: the circuit is opened as the bistable beam latches so that no power is consumed except during change of state.

Incorporating the control switch into the device adds no moving parts because the rod 62 is an integral part of the bistable beam. The rod can be stamped or etched from BeCu sheet metal. Electrical contacts and conductors can be formed on the upper and lower halves of the package to minimize manufacturing cost.

Switches 48 and 31 provide current paths for actuation to one or the other of the actuators. After the first actuator that opens the valve has completed its cycle, the switches are in position to operate the second actuator, and vise versa. The user has control switch 31 to select one of these positions at a time.

In one application of the invention that would be suitable for replacing a conventional AA size dry cell battery of 1.5V rating, the entire package comprising the valve sleeves, end caps and electrochemical cell would have the following specifications. The axial length of the package including end contacts would be 5 cm with an outer diameter of 1.32 cm. Each sleeve would have four rows of twelve slots each for a total of forty-eight slots. Each slot would be 1.0 mm wide with a total valve flow area for all slots of 36 mm². The sleeve stroke would be 1.2 mm.

The valve mechanism could be made as part of the battery having a housing comprising the valve sleeves and end caps into which an electrode, such as in the cell for a zinc-air battery, is inserted. That is analogous to replacement of a conventional battery. To re-charge the battery, an unused (fresh) electrode can be placed into the housing.

The following specifications for a typical battery application can be achieved by the present invention:

Power: 0.8 to 1.42 volts, current maximum of 35 ma
Time to turn on, less than 2 seconds; off, less than 3 seconds
Latching on/off mechanism using 2 TiNi wire actuators
Size: cylinder diameter 1.4 cm, 4.8 cm long
Air flow and leak rate: Multiple openings each 4 mm², closing to less than 0.2 mm².
Humidity: not critical While the foregoing embodiments are at present considered to be preferred, it is understood that numerous variations and modifications may be made therein by those skilled in the art and it is intended that the invention includes all such variations and modifications that fall within the true spirit and scope of the invention as set forth in the appended claims.

What is claimed is:

1. A control valve comprising the combination of an inner sleeve having a cylindrical outside surface and a cylindrical inside surface that encloses a chamber about a longitudinal axis, a zinc-air battery within the chamber, the batter being comprised of zinc which produces electrical current responsive to ingress of air into the battery, an outer sleeve having a cylindrical inside surface mounted in sliding contact on the outer surface of the inner sleeve, the inner sleeve further being mounted for reciprocating movement along the longitudinal axis between first and second axially spaced positions relative to the outer sleeve, first and second actuators, each actuator being formed of a shape memory alloy material having a crystalline phase change transition temperature and in which the actuators change shape by contraction responsive to being heated through their respective transition temperatures, a control circuit for heating the actuators through the transition temperatures, the first and second actuators being operatively connected in opposition with the inner sleeve for alternatively moving the inner sleeve between the first and second positions, the inner sleeve being formed with a plurality of first openings and the outer sleeve being formed with a plurality of second openings which substantially register with the first openings for opening a flow of the fluid therethrough when the inner sleeve is in the first position and further in which the second openings are substantially out of register with the first openings for closing the flow when the inner sleeve is in the second position, and a control mechanism for disabling actuation of the first or second actuator while enabling actuation of the respective second or first actuator.

2. A control valve as in claim 1 in which the control mechanism comprises a bistable latch for releasably holding the inner sleeve alternatively in the first or second positions.

3. A control valve as in claim 2 in which the bistable latch is connected with the inner sleeve, the latch changing shape toward a first bistable position responsive to movement of the inner sleeve to the first position and the latch further changing shape toward a second bistable position responsive to movement of the inner sleeve to the second position.

4. A control valve as in claim 3 in which the control circuit comprises a switch which is enabled in one switching mode for connecting the first actuator to an electric power source for resistance heating responsive to movement of the latch to the first bistable position while disconnecting the second actuator from the power source, and the switch is enabled in an other switching mode for connecting the second actuator to the power source responsive to movement of the latch to the second bistable position while disconnecting the first actuator from the power source.

5. A control valve as in claim 1 in which the first actuator has one end mounted to the inner sleeve and an opposite end mounted to the outer sleeve sufficient to cause movement of the inner sleeve to the first position responsive to contraction of the first actuator, and the second actuator has one end mounted to the inner sleeve and an opposite end mounted to the outer sleeve sufficient to cause movement of the inner sleeve to the second position responsive to contraction of the second actuator.

* * * * *